UNITED STATES PATENT OFFICE.

FRANK FORSTER RENWICK, OF BRENTWOOD, AND BERTRAM VINCENT STORR, OF ILFORD, ENGLAND, ASSIGNORS TO ILFORD LIMITED, OF ILFORD, ENGLAND.

PROCESS FOR THE RECOVERY OF SILVER FROM WEAK PHOTOGRAPHIC EMULSIONS.

1,234,390.      Specification of Letters Patent.      Patented July 24, 1917.

No Drawing.      Application filed October 17, 1916. Serial No. 126,223.

*To all whom it may concern:*

Be it known that we, FRANK FORSTER RENWICK and BERTRAM VINCENT STORR, subjects of the King of England, residing at Brentwood, in Essex, England, and Ilford, in Essex, England, respectively, have invented certain new and useful Improvements in Processes for the Recovery of Silver from Weak Photographic Emulsions, of which the following is a specification.

This invention is for improvements in or relating to processes for the recovery of silver from weak photographic emulsions, and has for its object to recover the silver from the diluted emulsions which have been thrown away heretofore, as waste, in the manufacture of photographic materials.

According to this invention, the process for recovering silver from dilute emulsions resulting from the manufacture of photographic materials consists in introducing into the liquor two or more reagents which by their mutual interaction produce a flocculent or gelatinous precipitate for the purpose of carrying the silver down, so that it can be afterward extracted by any means such as those commonly employed for recovering silver from concentrated emulsions.

In connection with the wet process of extracting copper from cuprous pyrites, it has been proposed to precipitate any traces of dissolved silver present in the strong copper solution, by the addition of a soluble iodid together with glue, the silver being thrown out in the form of an insoluble combination of silver, glue and iodin.

It is to be understood that the present invention relates only to the carrying down of insoluble precipitates which already exist in such a fine state of suspension in weak gelatin solutions that they will not settle rapidly. The glue and iodin do not form a precipitate when mixed together and can in fact be mixed prior to introducing them into the cuprous solution containing the silver, whereas the essential factor of the precipitants employed according to the present invention is that they shall form a precipitate when brought into contact with one another without the aid of any third element and they must therefore be added separately to the silver-containing emulsion.

The precipitates suitable for this purpose are hydrated alumina, ferric hydrate, resin, casein, etc., which may be produced by any of the well-known chemical reactions. For instance, a solution of alum followed by ammonia, may be employed, or a solution of resin-soap, or of casein in ammonia, followed by hydrochloric acid.

It has been found that 1,000 gallons of the liquor containing approximately 40 ounces of metallic silver as haloid salt and about 10 lbs. of gelatin, required 25 lbs. of dissolved sulfate of alumina followed by 1 gallon of ammonia of specific gravity .880.

Resin has been found to give satisfactory results under the same conditions when 14 lbs. of resin dissolved in an aqueous solution of $4\frac{1}{2}$ lbs. of anhydrous carbonate of soda was followed by a gallon of concentrated hydrochloric acid; also casein has given results in the same conditions when 24 lbs. of casein dissolved in 60 gallons of $\frac{1}{10}$ per cent. ammonia was followed by 100 ounces concentrated hydrochloric acid.

It will be appreciated that the strength of the solutions of sulfate of alumina and anhydrous carbonate of soda is not of importance, as they only need to be strong enough to prevent an unnecessary addition of liquid to the already dilute emulsion. These examples have been chosen with reference to a very dilute liquor but for stronger liquors the proportions of added chemicals required in relation to the silver content is lower.

By this process little gelatin appears to be brought down, but the precipitate formed in the liquor is found to carry the silver down with it.

What we claim as our invention and desire to secure by Letters Patent is:—

1. A process for recovering silver from dilute emulsions resulting from the manufacture of photographic materials consisting in the introduction into the liquor of two or more reagents which by their mutual interaction produce a flocculent or gelatinous precipitate for the purpose described.

2. A process for recovering silver from dilute emulsions resulting from the manufacture of photographic materials consisting in the introduction into the liquor of a solution of alum followed by ammonia which by their mutual interaction produce a flocculent or gelatinous precipitate for the purpose described.

In testimony whereof we have signed our names to this specification.

FRANK FORSTER RENWICK.
BERTRAM VINCENT STORR.